Feb. 9, 1971  G. T. SCHJELDAHL ET AL  3,562,372
METHOD OF SHAPING WHILE COOLING THE NECK PORTION
OF A BLOW MOLDED PLASTIC BOTTLE
Filed May 8, 1968  3 Sheets-Sheet 1
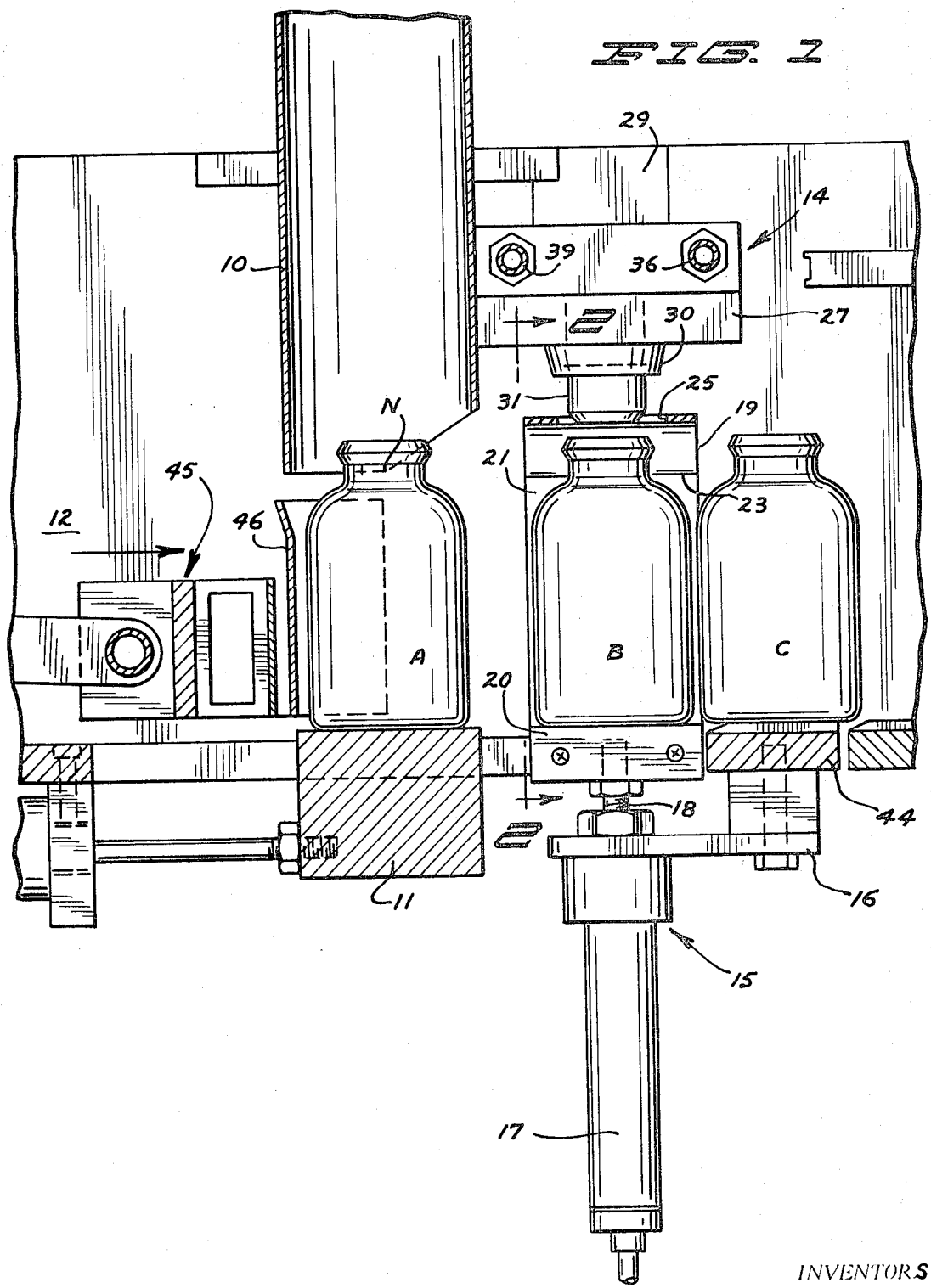
INVENTORS
GILMORE T. SCHJELDAHL
HARRY R. CARLSEN
BY JAMES A. WARREN
CHARLES EUMURIAN
ATTORNEYS

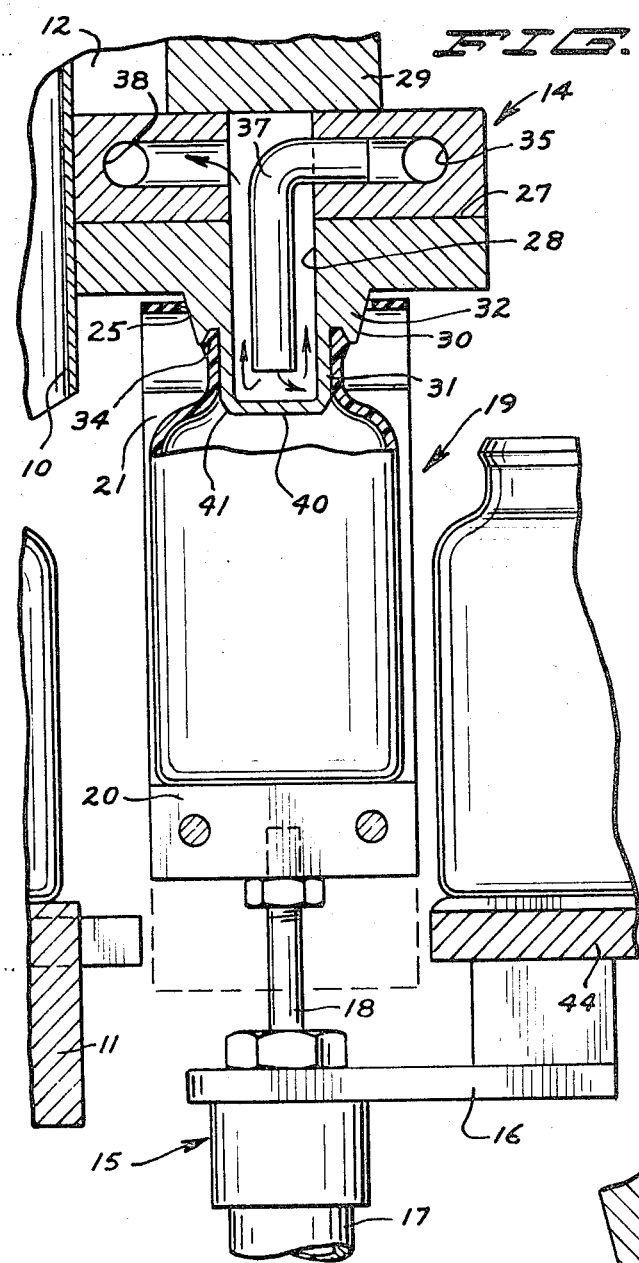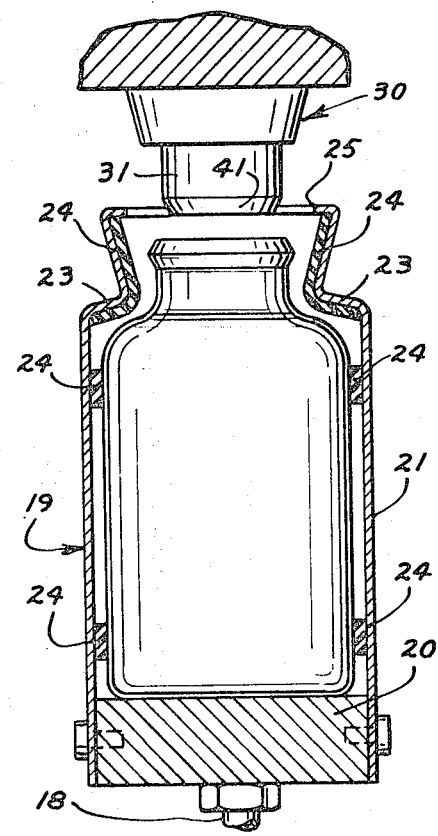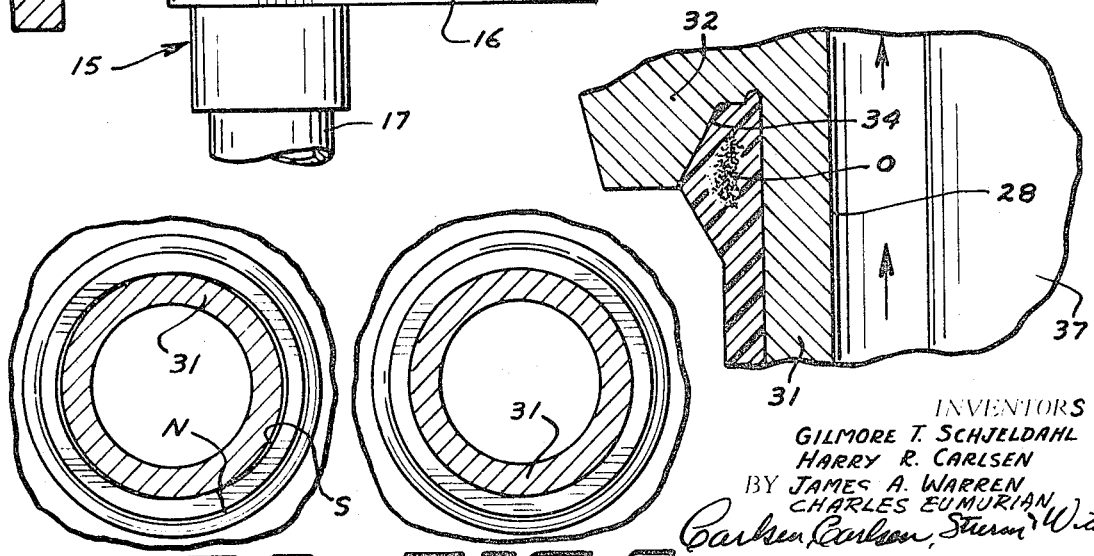

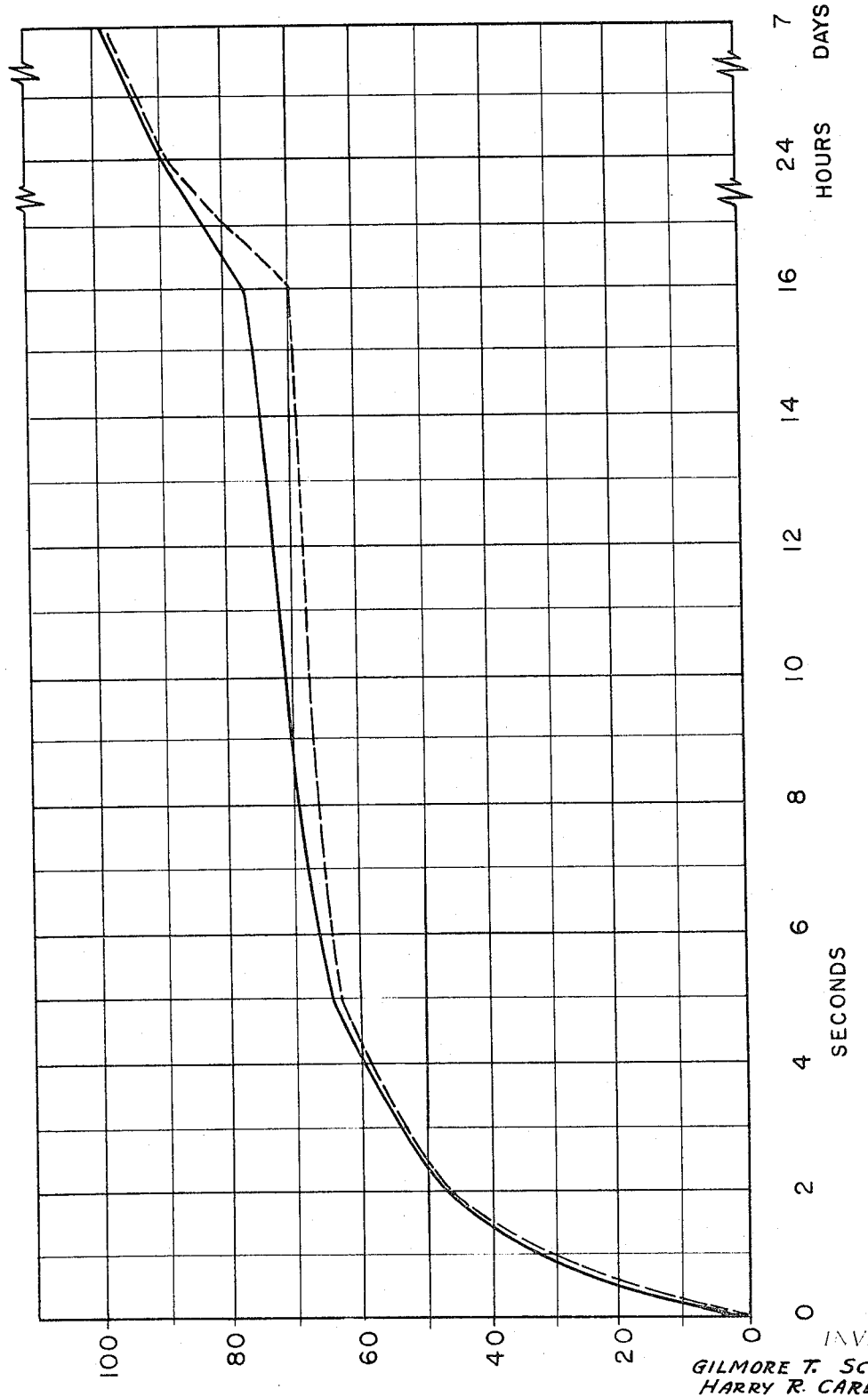

United States Patent Office 3,562,372
Patented Feb. 9, 1971

3,562,372
METHOD OF SHAPING WHILE COOLING THE NECK PORTION OF A BLOW MOLDED PLASTIC BOTTLE
Gilmore T. Schjeldahl, Northfield, Harry R. Carlsen and James A. Warren, Minneapolis, and Charles Eumurian, St. Paul, Minn., assignors to Giltech Corporation, Northfield, Minn., a corporation of Minnesota
Filed May 8, 1968, Ser. No. 727,603
Int. Cl. B29c 17/07, 25/00
U.S. Cl. 264—94          3 Claims

ABSTRACT OF THE DISCLOSURE

Cooling of the neck portion of a plastic bottle after blow molding by discharging the bottle from the blow mold and immediately inserting a chilled gage into the bottle neck portion so that such portion will shrink onto the gage and have its internal diameter conform to the gage.

---

In the blow molding of bottles of polyethylene or other plastic material the cooling of the bottle neck, also referred to as the neck ring, frequently presents a problem. This is due to the fact that the neck or neck ring of the bottle is generally molded to a greater thickness than the body portion necessitating a longer cooling period. Moreover, the tolerances of the bottle neck ring are generally more critical than those in the body due to the fact that the ring is generally designed to receive and mate with a snap-on or threaded cap or cover. It is accordingly desirable that the neck ring cooling take place with the neck in a captive condition to prevent movement of the plastic before it solidifies.

It is, of course, possible to allow the cooling to the desired temperature to take place while the bottle is still held in the neck ring mold. However, if this is done the other molds, injection or blow, which combine with the neck molds to form the body must also be withheld from use, thus extending the bottle forming cycle.

An object of the present invention is to provide a method of cooling the neck of a blow molded plastic bottle after the bottle has been discharged from the neck ring and blow molds so as to reduce the period of use of the blow molds.

Another object is to provide a method of cooling the neck on a blown plastic bottle which utilizes the shrinkage of the neck during a portion of the cooling period to clamp the neck onto a gage to assure accurate dimensions of and less stress in the completely cooled neck.

Still another object of the invention is to provide a method of cooling the neck ring of a blow molded bottle without providing temperature control means in the neck ring mold.

Normally, in the blow molding of plastic bottles the bottle neck is held in the neck ring mold until approximately 70 percent of the shrinkage has occurred. To effect this where the material used is one of the polyolefins such as polyethylene, it is desirable to bring the innermost portions of the neck to a temperature below 170° F. In other thermoplastics the same principles apply but at different temperatures. Where the bottle is discharged from a neck ring mold prior to occurrence of approximately 70 percent shrinkage, the neck will tend to distort to an undesirable out of round or irregular condition. However, with present neck ring mold cooling methods, in order to achieve the desired degree of shrinkage, it is necessary to leave the bottle in the neck ring mold much longer than in the blow mold, thus unnecessarily tying up use of the blow mold or requiring an additional neck ring mold or an additional cooling station to which the bottle is moved while still in the neck ring mold.

In the method herein disclosed it is found that the neck of the bottle can be successfully cooled by removing the bottle from the neck ring and blow molds after approximately 60 percent of the shrinkage has taken place. In such condition where the material is polyethylene the innermost portions of the neck may still have a molten temperature in excess of 230° F. while the outer surfaces may have been cooled to a solid condition at a temperature of 180° F. or less. The neck of the discharge bottle is then promptly subjected to a second cooling step. This may be effected by inserting a chilled plug or gage into the bottle neck. The subsequent neck shrinkage will cause the neck to shrink onto the gage, thus assuring that the neck material will crystallize in the desired shape within the required tolerances.

The above mentioned and additional objects of the invention will be brought to light during the course of the following specification, reference being made to the accompanying drawings, in which—

FIG. 1 is an elevation view of an apparatus in which the method forming the subject matter of this invention might be carried out.

FIG. 2 is an enlarged vertical section taken on line 2—2 of FIG. 1 showing an elevation view of a bottle in the cooling station.

FIG. 3 is a side elevation of a bottle with the neck thereof positioned on the cooling gage and with the gage in section to show the interior passageways for circulating a cooling medium.

FIG. 4 is an enlarged fragmentary section through a portion of the neck ring cooling gage with a bottle thereon.

FIG. 5 is a horizontal section through the gage and showing the bottle neck from the top in encircling relation to the gage immediately after the bottle has been raised onto the gage.

FIG. 6 is similar to FIG. 5 but showing the neck after it has been on the gage a few seconds.

FIG. 7 is a graph showing the comparative time curves between cooling to the desired temperature in the neck ring mold and cooling by the method of the present invention.

Referring now more particularly to the drawings reference characters will be used to denote like parts or structural features in the different views. In FIG. 1 the numeral 10 denotes the lower end portion of a discharge tube leading downwardly from a bottle blow mold such as that disclosed in copending application for patent Ser. No. 636,541, filed May 5, 1967. As a bottle is ejected from the blow mold it descends through tube 10 and comes to rest in upright position as shown upon a platform 11. Tube 10 and platform 11 are both integrally mounted on a base frame structure 12.

Also suitably mounted on the frame 12 are a fluid cooled neck gaging and cooling assembly 14 which will subsequently be described in detail, and a bottle carrier assembly mounted below assembly 14 and denoted generally at 15. Assembly 15 comprises a frame mounted bracket 16 supporting an extendible cylinder 17 with its piston rod 18 extending vertically upward. A bottle carrier 19 having a base 20 and a cage-like enclosure 21 is mounted on the upper end of rod 18. The cage 21, as best seen in FIG. 2, may be formed of wire or sheet metal and is open on the two sides with shoulders 23 formed in the front and back walls thereof adapted to extend inward toward the neck of a bottle B resting on base 20.

Pads denoted at 24 of resilient material such as felt are cemented to the front and rear walls of the cage 21 to center a bottle moved into the cage and protect the plastic walls thereof from damage or marking against the cage walls. The top of the cage is provided with an opening 25.

The assembly 14 is immovably mounted on the frame structure 12. It comprises a block 27 having a vertical passageway 28 which is closed at the upper end by a cap member 29. An annular gage member 30 is mounted on the underside of block 27 to close the lower end of passageway 28. The member 30 is cup-shaped with a cylindrical gage 31 having a peripheral flange 32 around its upper edge. Flange 32 is cut away as at 34 to form a downwardly opening annular groove around the gage 31.

Block 27 is provided with a fluid inlet duct 35 adapted to be connected to an inlet line 36 and communicate the same with passageway 28. An L-shaped tube 37 has one end press fit in the block to communicate with duct 35 and the other end portion depending axially in passageway 28. Block 27 is also provided with an outlet duct 38 which has one end in open communication with passageway 28 and the other end connected to an outlet line 39.

The tube 37 extends downwardly within passageway 28 and into the gage member 30 terminating short of the closed end 40 thereof. It will be understood that the block 27 and gage member 30 are cooled by a fluid such as cold water being circulated therethrough passing in through inlet line 36, duct 35 and tube 37 into the gage and then upwardly through passageway 28, duct 38 and line 39.

The gage 31 has its bottom annular edge beveled as at 41 and the groove 34 is configured in cross section to mate with and firmly seat the upper portion of a bottle neck as best shown in FIG. 4. Member 30 is preferably formed of a material having a relatively high thermal conductivity such as copper.

A discharge station 44 is mounted on the frame on the opposite side of the bottle carrier 19 from the platform 11 and at the same level. Station 44 may in effect be or lead to a bottle inspection station but such forms no part of the present invention.

A pusher device 45 is suitably driven and timed to move horizontally toward and away from the bottle cage 21 and has a holder 46 at its leading end for engaging against the side of a bottle disposed on the platform 11.

In FIG. 1 three bottles designated by the letters, A, B and C are shown going through the process. Bottle C is on the discharge station 44 having already been subjected to the neck cooling treatment. Bottle B has also been subjected to the treatment but is enclosed in carrier 19. A suitable cooling fluid is being continually circulated through gaging and cooling assembly 14 to maintain member 30 in a relatively cold condition.

Mechanism 45 is activated to push bottle A onto the base 20 of carrier 19 and bottle B is moved onto the discharge station 44. The pads 24 combined with the distance of movement of member 46 bring the bottle A to a position where the neck ring N thereof is in axial alignment with gage 31. Cylinder 17 is then activated to raise the carrier 19 and push neck N onto the gage with the top rim of the neck seated in groove 34 as shown in FIGS. 3 and 4. At this time, that is immediately after elevating the bottle, the ring N will fit loosely around the gage leaving a thin space therebetween as denoted by the letter S in FIG. 5. At this time the innermost or centermost portion of the neck ring as denoted at O in FIG. 4 is still relatively soft and subject to a certain amount of flow or movement. The liquid cooled gage 31 and flange 32 will rapidly withdraw heat from the neck ring and as this occurs the neck ring will shrink onto and around gage 31 with the internal diameter of the neck conforming to the gage. In practice the bottle is left on the gage approximately five seconds and during this period the neck ring will shrink to the condition shown in FIG. 6, eliminating the space S.

Cylinder 17 is then operated to retract the rod 18 and lower carrier 19. As this occurs the padded shoulders 23 on cage 21 will engage the shoulders of the bottle and strip it from gage 31 by pulling it downwardly off of it. During the cooling period another bottle has been deposited upon platform 11 and the operation is repeated.

FIG. 7 shows comparative time periods for shrinking the neck of a bottle formed of high density polyethylene. As hereinbefore indicated approximately 70 percent shrinkage must occur before the neck material is crystallized to the point of immobility. If the neck is left in the unrefrigerated neck ring mold (dotted line) it will take approximately 12 to 16 seconds to reach this percentage of shrinkage depending on the specific type and thickness of material. However, when the bottle is removed from the neck ring mold after the four second blowing period and then subjected to the cooling gage as in the present method (solid line) the desired percentage of shrinkage is reached in under ten seconds with less than three seconds of that time being used to transfer the bottle from the blow mold to the gage.

It will be understood that the process is carried on in an atmosphere of normal room temperature of say 70° F. When a bottle is ejected from the molding apparatus to drop onto platform 11 the temperature of the bottle neck will most desirably be in excess of 170° F. on the outside surface with the inner portions of the neck being somewhat higher. The gage is refrigerated to a temperature at which it will cool the innermost portions of the neck ring to below 170° F. within ten seconds.

It is understood that suitable modifications may be made in the structure as disclosed, provided such modifications come within the spirit and scope of the appended claims.

Having now therefore fully illustrated and described our invention, what we claim to be new and desire to protect by Letters Patent is:

1. The method of shaping while cooling the neck portion of a bottle formed in a blow mold which comprises,
   (a) discharging the bottle in a free condition downwardly from the blow mold onto a receiving station, with the neck portion up, into an atmosphere having a temperature lower than the temperature of the neck portion of the bottle,
   (b) moving said bottle while in said position laterally to a second station,
   (c) inserting a gage having a temperature lower than the neck portion temperature downwardly into the neck portion, said gage having the same cross sectional shape as the interior of the neck portion and of only slightly smaller size, to fit in peripheral engagement therewith,
   (d) and leaving the gage in the neck portion to withdraw heat therefrom until the neck portion shrinks thereon to crystallize in the desired shape.

2. The method of crystallizing the annular neck ring of a bottle after the bottle has been blow molded which comprises,
   (a) discharging the bottle from the blow mold in free condition before substantially 50 percent of the normal shrinkage by cooling of the ring has taken place,
   (b) inserting a generally cylindrical gage, having an external diameter somewhat less than the internal diameter of the neck, into the neck so that the neck fits loosely therearound,
   (c) circulating a cooling fluid through the gage to withdraw heat from the neck portion to cause the neck to shrink onto the gage and the internal periphery of the neck to conform to the external periphery of the gage,
   (d) then stripping the bottle off of the gage when at least 70 percent of the normal shrinkage by cooling has taken place.

3. The subject matter of claim 2 wherein the time between steps (a) and (b) is not over three seconds and the time between steps (b) and (d) is not over ten seconds.

References Cited

UNITED STATES PATENTS

| | | | |
|---|---|---|---|
| 3,186,028 | 6/1965 | Dobbins et al. | 18—5 |
| 3,294,883 | 12/1966 | Polka | 264—327X |
| 3,305,890 | 2/1967 | Senior et al. | 264—97X |

FOREIGN PATENTS

| | | | |
|---|---|---|---|
| 864,739 | 4/1961 | Great Britain | 18—5 |

ROBERT F. WHITE, Primary Examiner

T. J. CARVIS, Assistant Examiner

U.S. Cl. X.R.

18—5; 264—237, 336, 342